United States Patent
Mihara (10) Patent No.: US 10,082,997 B2
(45) Date of Patent: Sep. 25, 2018

(54) DISPLAY SYSTEM, DISPLAY APPARATUS AND ADJUSTMENT METHOD

(71) Applicant: NEC Display Solutions, Ltd., Tokyo (JP)

(72) Inventor: Tomohiro Mihara, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 5 days.

(21) Appl. No.: 15/074,792

(22) Filed: Mar. 18, 2016

(65) Prior Publication Data

US 2016/0313968 A1  Oct. 27, 2016

(30) Foreign Application Priority Data

Apr. 22, 2015 (JP) .................................. 2015-087670

(51) Int. Cl.
G06F 3/0488 (2013.01)
G06F 3/14 (2006.01)

(52) U.S. Cl.
CPC .......... *G06F 3/1446* (2013.01); *G06F 3/0488* (2013.01); *G09G 2370/025* (2013.01); *G09G 2370/042* (2013.01)

(58) Field of Classification Search
CPC ................ G06F 3/1446; G06F 3/0488; G09G 2370/042; G09G 2370/025
USPC .................................................. 345/2.1–2.3
See application file for complete search history.

(56) References Cited

U.S. PATENT DOCUMENTS

| | | | | |
|---|---|---|---|---|
| 2009/0160731 A1* | 6/2009 | Schuler | ................ | G06F 3/1423 345/1.1 |
| 2011/0231783 A1* | 9/2011 | Nomura | ................ | G06F 3/0488 715/761 |
| 2011/0296055 A1* | 12/2011 | Kim | ...................... | G06F 3/1423 710/3 |
| 2014/0313103 A1* | 10/2014 | Goel | ...................... | H04L 67/10 345/2.2 |
| 2014/0315489 A1* | 10/2014 | Lee | ......................... | G06F 3/1454 455/41.2 |
| 2015/0077365 A1* | 3/2015 | Sasaki | .................... | G06F 3/1446 345/173 |
| 2015/0286456 A1* | 10/2015 | Griffin | .................. | G06F 3/1446 345/1.2 |

(Continued)

FOREIGN PATENT DOCUMENTS

JP   2006-337482 A   12/2006

*Primary Examiner* — Kumar Patel
*Assistant Examiner* — Amy C Onyekaba
(74) *Attorney, Agent, or Firm* — McGinn I.P. Law Group, PLLC (57) ABSTRACT

A display system includes a plurality of display apparatuses. Each of the plurality of display apparatuses includes a display panel that displays an image and a sending and receiving unit that at least receives setting information of one of the plurality of display apparatuses. A first display apparatus that is one of the plurality of display apparatuses further includes a coordinate acquiring unit that acquires a coordinate. A first sending and receiving unit of the first display apparatus receives setting information of a second display apparatus specified by the coordinate from the second display apparatus. A first display panel of the first display apparatus displays a setting image that indicates the setting information.

9 Claims, 7 Drawing Sheets

(56) References Cited

U.S. PATENT DOCUMENTS

2016/0070523 A1* 3/2016 Kim ................. G06F 3/1454
                                                345/2.3
2016/0253930 A1* 9/2016 Lee ................. G06F 3/1446
                                                345/1.3

* cited by examiner

DISPLAY SYSTEM, DISPLAY APPARATUS AND ADJUSTMENT METHOD

This application is based upon and claims the benefit of priority from Japanese Patent Application No. 2015-087670, filed on Apr. 22, 2015, the disclosure of which is incorporated herein in its entirety by reference.

TECHNICAL FIELD

The present invention relates to a display system, a display apparatus, and an adjustment method.

BACKGROUND ART

Recently, number of display systems, in each of which a plurality of display apparatuses are arranged closely each other, increases. According to the display system, it is possible to make a whole of the plural display apparatus display one image, etc.

When using the display system, there are often cases that it is desired to change setting of only a specific display apparatus out of the plural display apparatuses which are included in the display system. For example, PLT (Patent Literature) 1 describes an invention on a display apparatus that, by use of a remote controller, only a predetermined display apparatus can carry out a desired work out of a plurality of display apparatuses which compose a multi-screen.

CITATION LIST

Patent Literature

[PTL 1] Japanese Patent Application Laid-Open Publication No. 2006-337482

SUMMARY

According to the display apparatus described in PTL 1, when selecting the specific display apparatus whose setting should be changed, a cursor button of the remote controller is used. As number of the display apparatuses of the display system becomes increasing, number of cases to push the cursor button becomes increasing. Moreover, as the display apparatus becomes large in size, a position of a setting image, which is displayed by a selected display apparatus, becomes far from a user and consequently the user cannot watch the setting image with ease.

An example of an object of the present invention is to provide a display system, a display apparatus and a control method by which it is possible to comfortably change setting of a specific display apparatus out of a plurality of display apparatuses included in a display system.

In order to achieve the above-described object, a display system according to an aspect of the present invention includes: a plurality of display apparatuses, each of the plurality of display apparatuses including: a display panel which displays an image; and a sending and receiving unit which sends and/or receives setting information of any one of the plurality of display apparatuses. A first display apparatus which is any one of the plurality of display apparatuses further includes a coordinate acquiring unit which acquires a coordinate. A first sending and receiving unit of the first display apparatus receives second setting information of a second display apparatus specified by the coordinate, from the second display apparatus. A first display panel of the first display apparatus displays a setting image which indicates the second setting information.

In order to achieve the above-described object, a display apparatus according to another aspect of the present invention includes: a display panel which displays an image; a coordinate acquiring unit which acquires a coordinate; and a receiving unit which receives setting information of another display apparatus which is specified by the coordinate. The display panel displays a setting image which indicates the setting information.

In order to achieve the above-described object, a method according to another aspect of the present invention, is an adjustment method for a display system which includes a plurality of display apparatuses. The method includes: acquiring a coordinate; receiving second setting information of a second display apparatus specified by the coordinate, from the second display apparatus; and making a first display apparatus which is any one of the plurality of display apparatuses, display a setting image which indicates the second setting information.

BRIEF DESCRIPTION OF THE DRAWINGS

FIG. 1A and FIG. 1B are diagrams showing configurations of a display system of an exemplary embodiment of the present invention.

FIG. 5A and FIG. 5B are examples of an operation of the display system of the exemplary embodiment.

EXEMPLARY EMBODIMENT

Hereinafter, an exemplary embodiment of the present invention will be explained with reference to drawings.

Figure 1A:
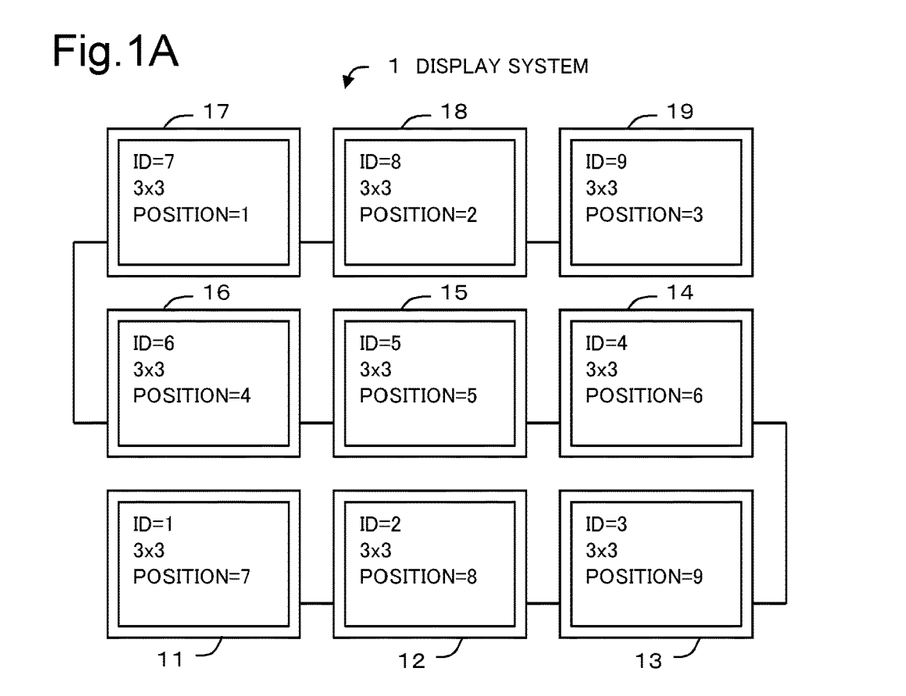
FIG. 1A shows settings and wirings of display apparatuses which are included in the display system.
Figure 1B:
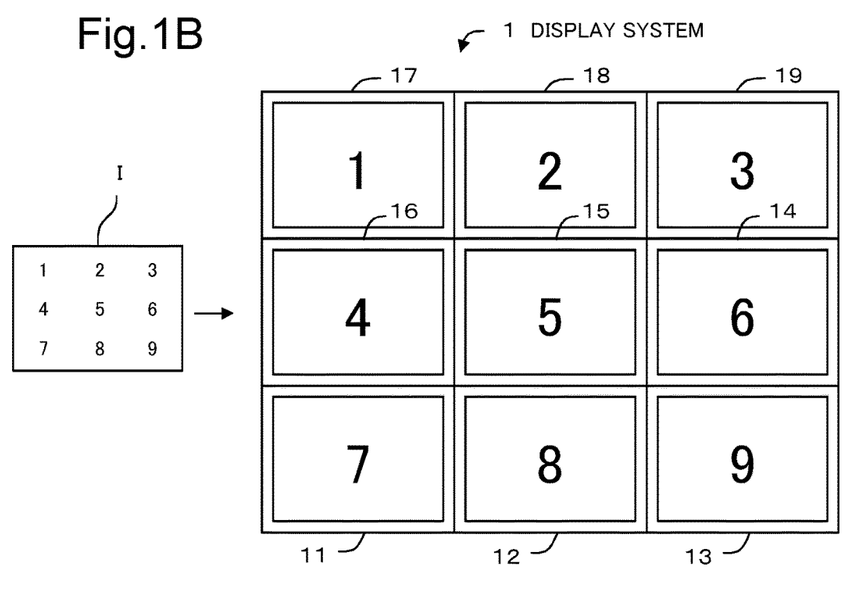
FIG. 1B shows an external appearance of the display system.

FIG. 1A and FIG. 1B show configurations of a display system 1 of the present embodiment.

FIG. 1A shows settings and wirings of display apparatuses 11 to 19 which are included in the display system 1.

Communication cables, such as a LAN (Local Area Network) cable or a RS-232C (Recommended Standard 232 version C) cable, are connected with the display apparatuses 11 to 19 respectively in a form of the daisy chain. Moreover, similarly to the communication cables, display cables for transmitting an image signal are connected with the display apparatuses 11 to 19 respectively in a form of the daisy chain. As an identification number ID (Identification), '1' is assigned to the display apparatus 11 in advance. The display apparatus 11 works as a master display in the display system 1. IDs of '2' to '9' are assigned to the display apparatuses 12 to 19 respectively, that are connected with the display terminal 11 through the communication cables which are in the form of the daisy chain and the display cables which are in the form of the daisy chain, in an order of the connection. The display apparatuses 12 to 19 work as a slave display in the display system 1.

The display apparatuses 11 to 19, which are included in the display system 1, are arranged so that 3 display apparatuses may be arranged in a vertical direction, and 3 display apparatuses may be arranged in a horizontal direction These figures are set in the display apparatuses 11 to 19 as '3×3'. As POSITION which indicates an arrangement number, '1' is assigned to the upper-left display apparatus 17. Moreover, as POSITION, '2' to '9' are assigned to the other display apparatuses 11 to 16, 18 and 19 on the basis of the arrangement.

FIG. 1B shows an external appearance of the display system 1. The display apparatuses 11 to 19 input an image signal of an image I respectively, and a whole of the display apparatuses 11 to 19 displays the image I. The display of the image I is realized by the above-mentioned settings of the display apparatuses 11 to 19. For example, by setting '3×3' which indicates number of the display apparatuses arranged in the vertical direction, and number of the display apparatuses arranged in the horizontal direction respectively, and POSITION '7', the display apparatus 11 displays a lower-left partial image out of partial images which are generated by dividing the image I into 3 sections in the vertical direction, and 3 sections in the horizontal direction. Similarly, each of the display apparatus 12 to 19 displays the partial image which is based on each the setting.

Here, it is not always necessary that the communication cable and the display cable are in the form of the daisy chain. It is enough that the display apparatuses 11 to 19 can receive setting information and the image signal.

Figure 2:
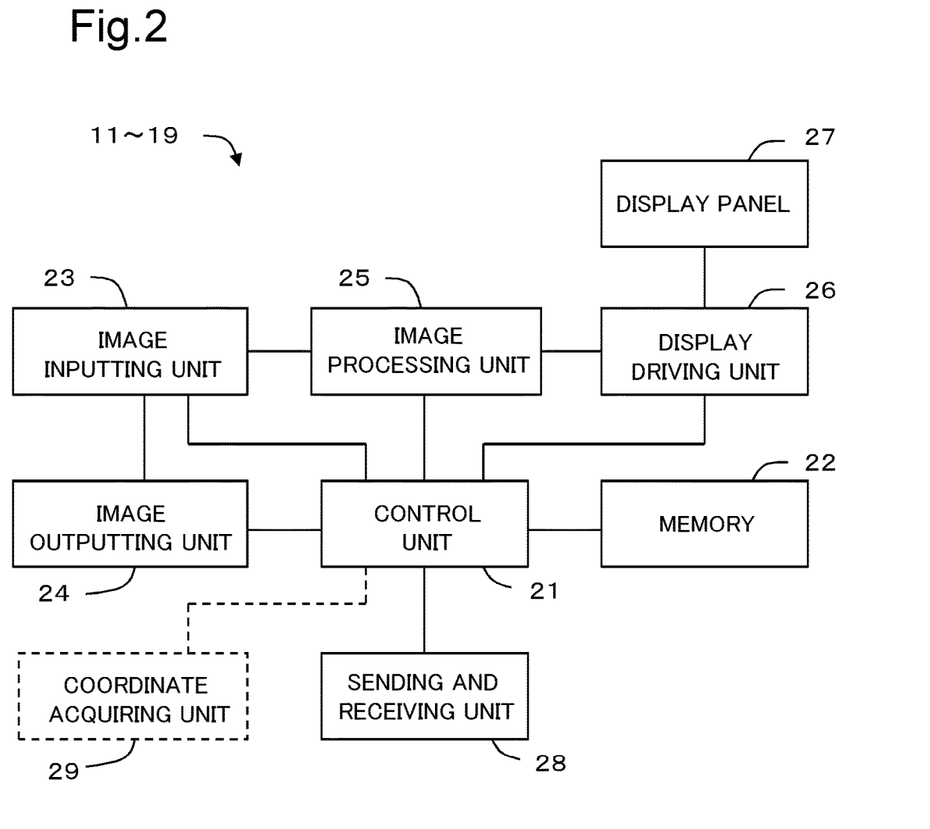
FIG. 2 is a block diagram of the display apparatus which is included in the display system of the exemplary embodiment.

FIG. 2 is a block diagram of the display apparatuses 11 to 19. The block diagrams of the display apparatus 11 to 19 are common except for a specific display apparatus. Each of the display apparatuses 11 to 19 includes a control unit 21, a memory 22, an image inputting unit 23, an image outputting unit 24, an image processing unit 25, a display driving unit 26, a display panel 27 and a sending and receiving unit 28. The display apparatus 11 furthermore includes a coordinate acquiring unit 29.

The control unit 21 of each of the display apparatuses 11 to 19 carries out various processes. For example, with reference to the setting information which the memory 22 stores, the control unit 21 carries out setting, which is based on the setting information, to the image processing unit 25. The control unit 21 is, for example, MPU (Micro-Processing Unit).

The memory 22 stores, at least, the setting information of the display apparatus. For example, the memory 22 of the display apparatus 11 stores the setting information of the display apparatus 11. Moreover, the memory 22 of the display apparatus 11 may furthermore store the setting information of the display apparatus other than the display apparatus 11. The memory 22 is, for example, RAM (Random Access Memory) of a flash memory.

The image inputting unit 23 inputs the image signal. The image inputting unit 23 is connected with the display cable. The image signal, which is outputted by an image signal outputting apparatus or the like, is transmitted through the display cable, and inputted into the image inputting unit 23.

The image outputting unit 24 usually outputs an image signal which is the same as the image signal inputted into the image inputting unit 23. Also the image outputting unit 24 is connected with the display cable. The display cable is connected with the image inputting unit 23 of the display apparatus which is arranged at a just rear position. Here, the image outputting unit 24 may output an image signal which is different from the image signal inputted into the image inputting unit 23.

The image processing unit 25 carries out an image processing on the basis of the image signal inputted into the image inputting unit 23. The image processing is an image processing for adjusting image quality such as brightness, color or the like, or for converting resolution. The image processing is carried out on the basis of the setting information which is set by the control unit 21. Moreover, when receiving an instruction to display an OSD (On Screen Display) image (setting image) from the control unit 21, the image processing unit 25 generates an image including the OSD image. The image processing unit 25 generates also an arrangement image mentioned later.

The display driving unit 26 makes the display panel 27 display the image which is received from the image processing unit 25. Specifically, the display driving unit 26 generates a signal for driving the display panel 27, and outputs the signal to the display panel 27.

The display panel 27 has a display area as an area in which an image is displayed. The display panel 27 displays the image, which is based on the signal inputted from the display driving unit 26, in the display area.

That is, the display panel 27 displays the image which the image processing unit 25 generates, and displays the OSD image. Here, the display panel 27 is, for example, a liquid crystal panel, an organic EL (Electro Luminescence), a plasma display panel or the like.

The sending and receiving unit 28 sends or receives the setting information of the display apparatus. The sending and receiving unit 28 is connected with the communication cable such as the LAN cable, the RS-232C cable or the like. The above-mentioned communication cable is connected also with the sending and receiving unit 28 of the display apparatus which is arranged at a just rear position.

The coordinate acquiring unit 29 acquires a coordinate in the display area of the display panel 27 or a coordinate corresponding to the above-mentioned display area. The coordinate acquiring unit 29 includes, for example, a touch panel, and acquires the coordinate on the basis of touch handling on the touch panel. Moreover, the coordinate acquiring unit 29 includes, for example, a radio wave receiving unit which receives a radio wave, and acquires the coordinate on the basis of the radio wave received from a remote controller which emits a radio wave carrying information corresponding to motion, a position or the like. Furthermore, the coordinate acquiring unit 29 may include, for example, an infrared light receiving unit, and receive an infrared light which a remote controller emits, and acquire the coordinate on the basis of the received infrared light.

Figure 3:
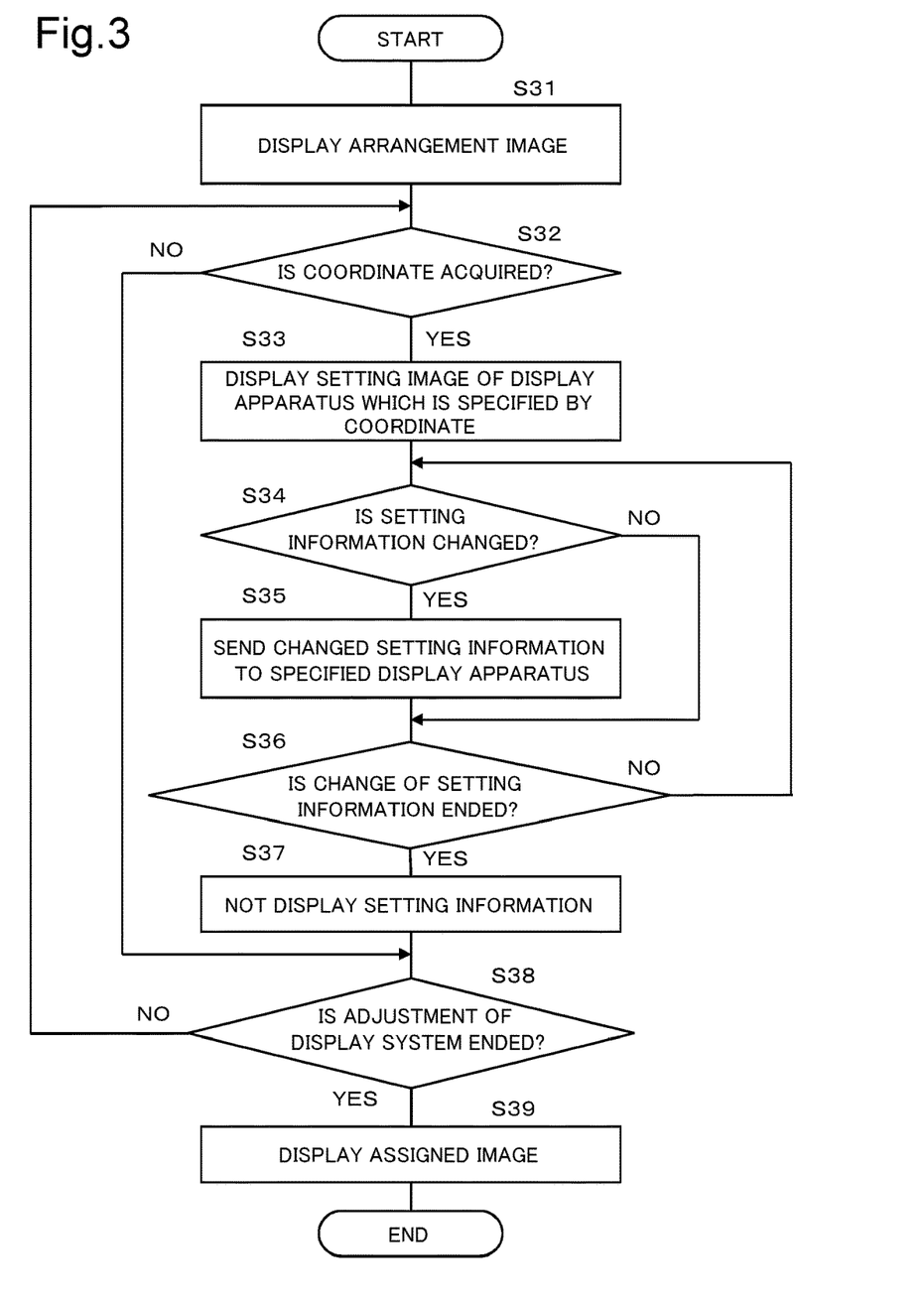
FIG. 3 is an operational flowchart of the display apparatus, which works as a master display, out of the plural display apparatuses which are included in the display system of the exemplary embodiment.

FIG. 3 is an operational flowchart of the master display in the display system 1.

Here, the master display in the display system 1 is the display apparatus 11. It is assumed in the operational flowchart that a setting change mode, which is used in the case of intending to change setting of only a specific display apparatus out of the plural display apparatuses 11 to 19 included in the display system 1, is selected. That is, it is assumed that the setting change mode is selected at a time of 'Start' of the operational flow chart Firstly, the arrangement image is displayed (Step S31). Specifically, the display driving unit 26 of the master display makes the display panel 27 display the arrangement image. The arrangement image is an image which indicates arrangement of the plural display apparatuses included in the display system. The arrangement image is an image corresponding to a whole of the image based on the image signal which is inputted into the image inputting unit 23.

Next, it is judged whether the coordinate is acquired or not (Step S32). Specifically, in the case that the coordinate acquiring unit 29 acquires the coordinate, the control unit 21 judges that the coordinate is acquired (Step S32—YES). On the other hand, in the case that the coordinate acquiring unit 29 does not acquire the coordinate, the control unit 21 judges that the coordinate is not acquired (Step S32—NO).

In the case that the coordinate acquiring unit 29 acquires the coordinate (Step S32—YES), the setting image of the display apparatus, which is specified by the coordinate, is displayed (Step S33). Specifically, the OSD image of the display apparatus (that is, the selected display apparatus), which is specified by the coordinate, out of the display apparatuses 11 to 19 is displayed on the display panel 27 of the master display. The image processing unit 25 of the master display generates the OSD image on the basis of the setting information of the specified display apparatus. When receiving a request from the master display, the sending and receiving unit 28 of the selected display apparatus sends the setting information to the master display. The request from the master display is sent at a time when selecting the display apparatus, or before the time. Here, the OSD image of the selected display apparatus may be generated by the display apparatus such as the selected display apparatus or the like other than the master display.

Here, the coordinate, which is acquired by the coordinate acquiring unit 29, is a coordinate which is corresponding to a position in the arrangement image displayed on the display panel 27. The coordinate is, for example, a coordinate in the arrangement image. The coordinate may be a coordinate which indicates a position in the touch panel or the like.

Next, it is judged whether the setting information is changed or not (Step S34). The OSD image, which is displayed on the display panel 27 of the master display, includes the setting information of the specified display apparatus. A user can change the setting information by inputting the coordinate while watching the OSD image, etc. In S34, the control unit 21 of the master display judges whether the setting information is changed or not.

In the case that the setting information is changed (Step S34—YES), the changed setting information is sent to the specified display apparatus (Step S35). Specifically, the control unit 21 of the master display makes the sending and receiving unit 28 send the changed setting information. Information indicating the specified display apparatus is attached to the setting information which should be sent.

On the other hand, in the case that the setting information is not changed (Step S34—NO), S35 is not carried out.

Next, it is judged whether to change the setting information is ended or not (Step S36). For example, in the case of receiving an instruction to end changing the setting information, the control unit 21 of the master display judges that to change the setting information is ended. Moreover, in the case of receiving an instruction not to display the OSD image which has been displayed, the control unit 21 of the display apparatus 11 may judge that to change the setting information is ended.

In the case that to change the setting information is ended (Step S36—YES), the setting image becomes not displayed (Step S37). Specifically, the OSD image, which has been displayed on the display panel 27, becomes not displayed.

On the other hand, in the case that to change the setting information is not ended (Step S36—NO), the operation returns to S34.

Next, it is judged whether adjustment of the display system is ended or not (Step S38). Specifically, in the case of receiving an instruction to end the setting change mode, the control unit 21 of the master display judges that adjustment of the display system 1 is ended (Step S38—YES).

In the case that adjustment of the display system is ended (Step S38—YES), an assigned image is displayed (Step S39). Specifically, an image, which is corresponding to a part of the image based on the image signal, is displayed on the display panel 27 of the master display.

On the other hand, in the case that adjustment of the display system is not ended (Step S38—NO), the operation returns to S32.

Here, the judgments in the above-mentioned S32, S34, S36 and S38 may not be carried out. Similarly to the case that the judgments are carried out, also in the case that the judgments are not carried out, the continuing operations, which are described after each of S32, S34, S36 and S38 in the operational flowchart shown in FIG. 3, are carried out according to the condition of each of S32, S34, S36 and S38.

Figure 4:
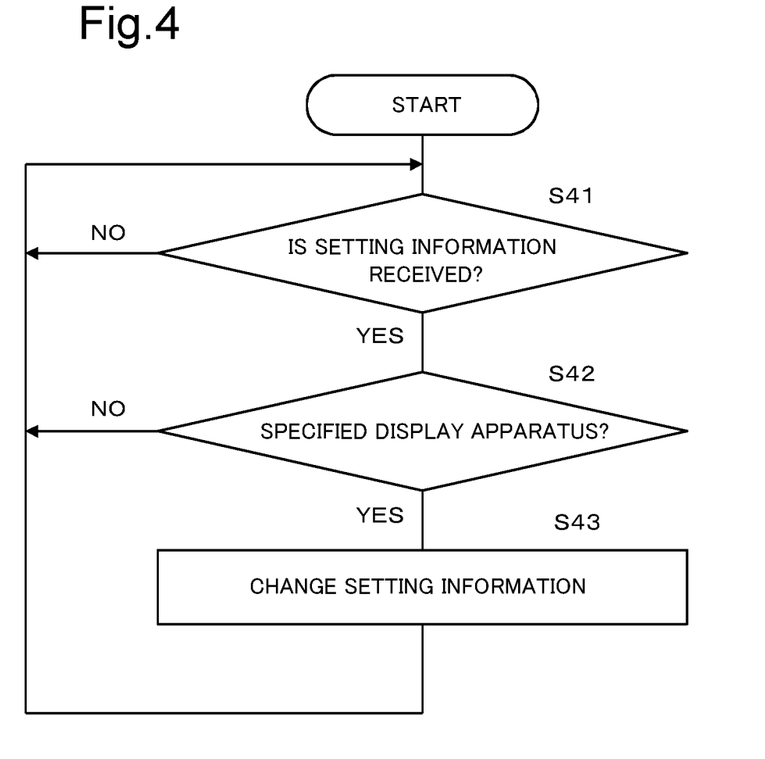
FIG. 4 is an operational flowchart of the display apparatus, which works as a slave display, out of the plural display apparatuses which are included in the display system of the exemplary embodiment.

FIG. 4 is an operational flowchart of the slave display in the display system 1.

The slave display in the display system 1 is the display apparatuses 12 to 19.

It is assumed in the operational flowchart that the above-mentioned setting change mode is selected in the display apparatus 11. That is, the operational flowchart will be explained on the assumption that the setting change mode is selected at a time of 'Start' of the operational flow chart. Here, there may be no setting change mode in the slave display. Even if there is no setting change mode in the slave display, it is enough that the slave display operates according to the operational flowchart shown in FIG. 4.

Firstly, it is judged whether the setting information is received or not (Step S41). Specifically, it is judged whether the sending and receiving unit 27 of the slave display receives the setting information, which is sent in the above-mentioned S35, or not.

In the case of receiving the setting information (Step S41—YES), it is judged whether the slave display, which receives the setting information, is the specified display apparatus or not (Step S42). Specifically, on the basis of the information which is attached to the setting information sent in the above-mentioned S35, the control unit 21 of the slave display judges whether the slave display is the specified display apparatus or not.

In the case of the specified display apparatus (Step S42—YES), the setting information is changed (Step S43). Specifically, the control unit 21 of the slave display makes the memory 22 store the setting information which the sending and receiving unit 28 receives, and carries out setting, which is based on the setting information, to the image processing unit 25. As a result, the slave display displays the image on the display panel 27 on the basis of the received setting information.

Here, in the case of not receiving the setting information (Step S41—NO) or in the case of not the specified display apparatus (Step S42—NO), the operation returns to S41.

Figure 5A:
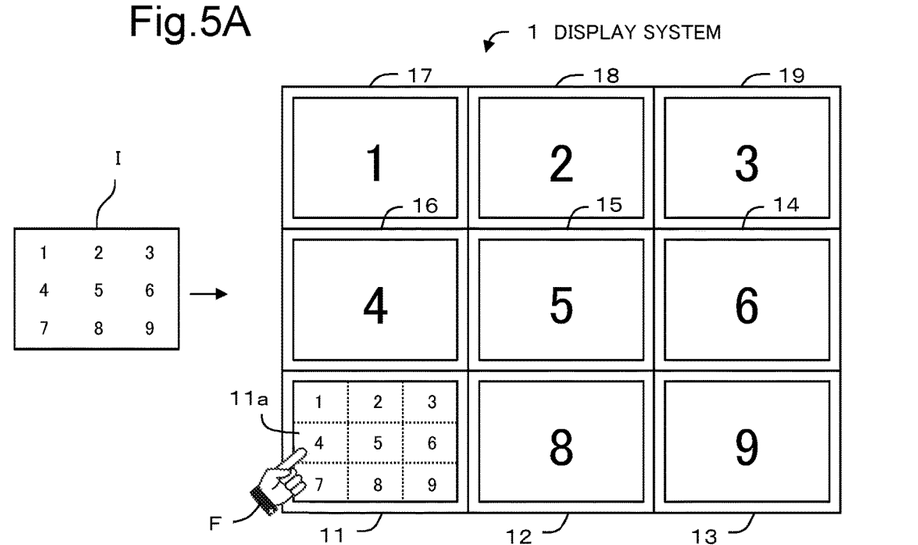
FIG. 5A shows an initial state of a case that a setting change mode is selected.
Figure 5B:
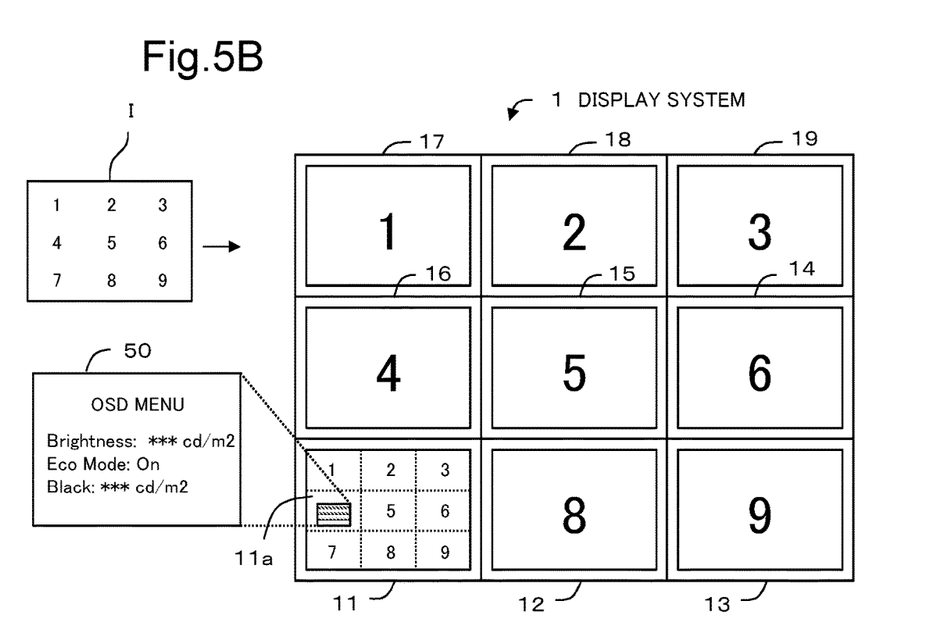
FIG. 5B shows a state that a specific display apparatus is selected in the setting change mode.

FIG. 5A and FIG. 5B are examples of the operation of the display system 1 of the present invention. Hereinafter, the example of the operation will be explained on the assumption that the coordinate acquiring unit 29 of the display apparatus 11 includes the touch panel.

FIG. 5A shows an initial state of a case that the setting change mode is selected.

The display apparatus 11, which is the master display, displays the arrangement image (Step S31). The arrangement image is an image generated by adding a guide line to an image which is the same as the image I displayed by a whole of the display system 1. The guide line is a guide line which divides the image I into 3 sections in the vertical direction and 3 sections in the vertical direction on the basis of '3×3' which indicates the number of the display apparatuses arranged in the vertical direction and the number of the display apparatuses arranged in the horizontal direction.

In the case that a finger F touches to an area 11a, in which '4' is displayed, out of the image I displayed by the display apparatus 11 (Step S32), the control unit 21 of the display apparatus 11 judges that the display apparatus 16 is specified.

FIG. 5B is a diagram showing a state that the display apparatus 16 is specified. In this state, an OSD image 50 of the display apparatus 16 is displayed in the area 11a of the display apparatus 11 (Step S33). While the display apparatus 16 does not display the OSD image in FIG. 5B, the display apparatus 16 may display the OSD image.

The OSD image 50 includes the setting information of the display apparatus 16. The setting information is information which the sending and receiving unit 28 of the display apparatus 16 sends and the sending and receiving unit 28 of the display apparatus 11 receives. The user can change the setting information of the display apparatus 16 by carrying out the touch handling or the like to the display apparatus 11 while watching the OSD image 50.

In the case that the setting information of the display apparatus 16 is changed (Step S34—YES), the sending and receiving unit 28 of the display apparatus 11 sends the changed setting information to the display apparatus 16 which is the specified display apparatus (Step S35). Information indicating the display apparatus 16 which is the specified display apparatus is attached to the sent setting information.

The sending and receiving unit 28 of each of the display apparatuses 12 to 19, which are the slave display, receives the setting information which the display apparatus 11 sends (Step S41—YES). On the basis of the information which is attached to the setting information, it is judged that only the display apparatus 16 is the specified display apparatus. On the other hand, it is judged that the display apparatuses 12 to 15, and 17 to 19 are not the specified display apparatus (Step S42—NO).

Then, the control unit 21 of the display apparatus 16 makes the memory 22 store the received setting information and sets the setting information in the image processing unit 25. As a result, the display apparatus 16 displays the image on the display panel 27 on the basis of the received setting information.

Here, in the case that to change the setting information of the display apparatus 16 is ended (Step S36—YES), the OSD image 50 which has been displayed by the display apparatus 11 becomes not displayed (Step S37), and consequently the display state shown in FIG. 5A is generated. Furthermore, in the case that adjustment of the display system 1 is ended (Step S38—YES), that is, in the case that the setting change mode is not selected, the display apparatus 11 which is the master display, the display apparatus 11 displays the assigned image (Step S39). That is, the display state shown in FIG. 1B is generated.

Here, in the case that the setting change mode is selected, the display apparatus 11, which is the master display, may display the image on the basis of the setting information of each of the display apparatuses 12 to 19 which are the slave display. In this case, the display apparatus 11 sends a request to the display apparatuses 12 to 19, which are the slave display, at a time when the setting change mode is selected, or before the time, and receives the setting information of each of the display apparatuses 12 to 19. Then, the display apparatus 11 displays the partial images, which are formed by dividing the image I into 3 sections in the vertical direction and 3 sections in the horizontal direction, on the basis of the setting information or the changed setting information of each of the display apparatuses 12 to 19.

As mentioned above, according to the display system 1 of the exemplary embodiment of the present invention, the display apparatus 11, in which the setting change mode is selected, displays the image which is the same as the image I displayed by a whole of the display system 1. Moreover, the display apparatus 11 includes the coordinate acquiring unit 29 which includes the touch panel or the like. Therefore, the user can easily select the display apparatus, whose setting is desired to be changed by the user, by carrying out the touch handling to the display apparatus 11 to designate the coordinate while watching the image displayed by the display apparatus 11.

When selecting the display apparatus, the setting image is displayed by the display apparatus 11. Therefore, the user can change the setting of the selected display apparatus by carrying out the touch handling to the display apparatus 11 or the like while watching the setting image displayed by the display apparatus 11.

Furthermore, the setting image of the selected display apparatus is displayed in the display area which is corresponding to the position of the selected display apparatus. Therefore, the user can easily recognize the display apparatus whose setting should be changed.

Accordingly, the display system of the exemplary embodiment of the present invention makes it possible to comfortably change the setting of the specific display apparatus out of the plural display apparatuses which are included in the display system.

Figure 6:
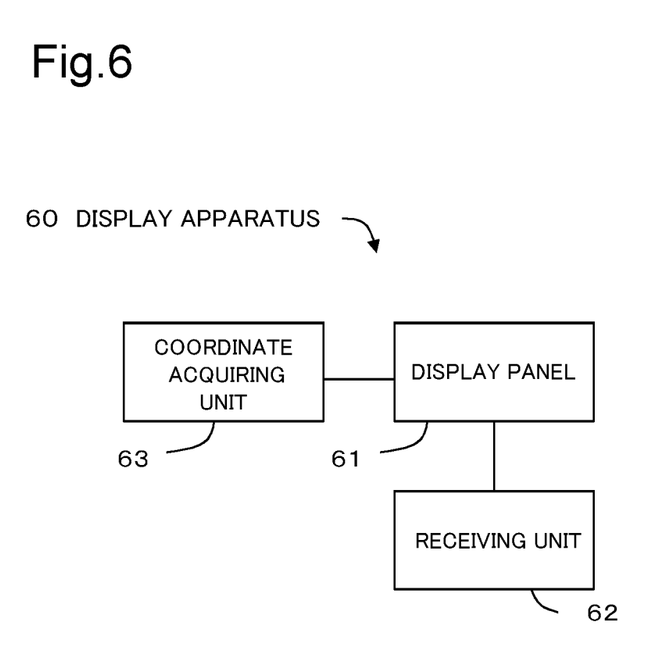
FIG. 6 is a block diagram of the display apparatus of the exemplary embodiment.

Next, a display apparatus 60 of the exemplary embodiment of the present invention will be explained. The display apparatus 60 is a display apparatus, which works as the master display, out of the plural display apparatuses which are included in the display system.

FIG. 6 is a block diagram of the display apparatus 60. The display apparatus 60 includes a display panel 61, a receiving unit 62 and a coordinate acquiring unit 63.

The display panel 61 is the same as the display panel 27. The display panel 61 displays an image.

The receiving unit 62 is the same as the sending and receiving unit 28. The receiving unit 62 receives setting information of another display apparatus.

The coordinate acquiring unit 63 is the same as the coordinate acquiring unit 29. The coordinate acquiring unit 63 acquires a coordinate.

Figure 7:
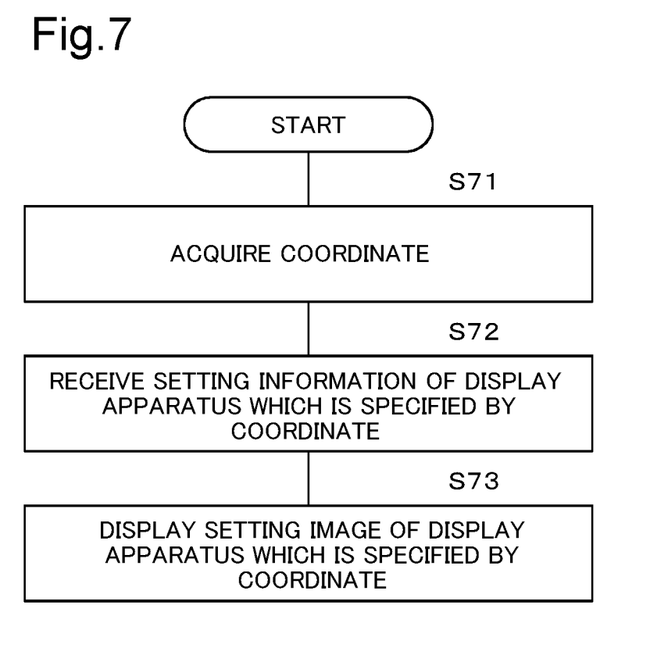
FIG. 7 is an operational flowchart of the display apparatus of the exemplary embodiment.

FIG. 7 is an operational flowchart of the display apparatus 60.

Firstly, the coordinate is acquired (Step S71). Specifically, the coordinate acquiring unit 63 acquires the coordinate.

Next, setting information of a display apparatus, which is specified by the coordinate, is received (Step S72).

Specifically, the receiving unit 62 receives the setting information of the specified display apparatus.

Here, an order of S71 and S72 may be reverse. That is, before acquiring the coordinate, the setting information of each of the plural display apparatuses, which are included in the display system, may be received in advance.

Then, a setting image of the display apparatus which is specified by the coordinate is displayed (Step S73).

Specifically, the display panel 61 displays the setting image which indicates the setting information of the specified display apparatus.

As mentioned above, the display apparatus 60 of the exemplary embodiment of the present invention displays the setting image of the other display apparatus specified by the coordinate which is instructed to the display apparatus 60. Therefore, the user can easily select the display apparatus whose setting is desired to be changed by the user, and can read the setting information in the same display apparatus. By virtue of the above, the user can change the setting of the selected display apparatus by carrying out the touch handling to the display apparatus 60 or the like while watching the image displayed by the display apparatus 60.

Accordingly, by the display apparatus of the exemplary embodiment of the present invention, it is possible to comfortably change the setting of the specified display apparatus out of the plural display apparatuses which are included in the display system.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An adjustment method for a display system which comprises an arrangement of a plurality of display apparatuses, the adjustment method comprising:
    displaying in a first display apparatus of the plurality of display apparatuses an arrangement image;
    acquiring a coordinate in the first display apparatus, the coordinate specifies a position of a second display apparatus of the plurality of display apparatuses displayed in the arrangement image;
    receiving in the first display apparatus setting information of the second display apparatus;
    generating in the first display apparatus a setting image based on the setting information received from the second display apparatus, the setting image indicates the received setting information;
    displaying in the first display apparatus the setting image, the setting image is displayed in a display area of the first display apparatus corresponding to a location of the second display apparatus in the arrangement of the plurality of display apparatuses; and
    adjusting image quality of the second display apparatus using the setting image displayed in the first display apparatus.

2. The adjustment method according to claim 1, wherein:
    the arrangement image is an image generated by adding a guide line to an image which is the same as the image displayed by a whole of the display system.

3. The adjustment method according to claim 1, wherein the first display apparatus comprises a circuit that at least receives setting information,
    and a coordinate acquiring circuit that acquires the coordinate.

4. The adjustment method according to claim 1, wherein the display system includes:
    a memory storing computer instructions;
    a processor executing the computer instructions and configured to receive the setting information.

5. The adjustment method according to claim 1, wherein the setting information of the second display apparatus specified by the coordinate is received from the second display apparatus.

6. The adjustment method according to claim 1, wherein a first display panel of the first display apparatus displays an arrangement image that indicates the arrangement of the plurality of display apparatuses, and wherein the coordinate is a coordinate corresponding to the position in the arrangement image.

7. The adjustment method according to claim 1, further comprising of:
    sending and receiving the setting information of one of the plurality of display apparatuses; and
    sending the setting information that is changed based on information inputted into the first display apparatus, to the second display apparatus.

8. The adjustment method according to claim 1, wherein:
    in a case of receiving a request from the first display apparatus, the second display apparatus sends the setting information to the first display apparatus.

9. The adjustment method according to claim 1, wherein:
    the first display apparatus further comprises a touch panel to which a touch operation is carried out; and
    the coordinate is acquired based on the touch operation carried out.

* * * * *